United States Patent
Xue et al.

(10) Patent No.: US 8,379,528 B1
(45) Date of Patent: Feb. 19, 2013

(54) TRANSFER OF MESSAGES TO USER DEVICES OF A WIRELESS LOCAL AREA NETWORK ACCESS POINT

(75) Inventors: Wen Xue, Overland Park, KS (US); Sharon L. Woodrum, Louisburg, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 313 days.

(21) Appl. No.: 12/905,871

(22) Filed: Oct. 15, 2010

(51) Int. Cl.
*H04L 12/26* (2006.01)

(52) U.S. Cl. ........................................... 370/241

(58) Field of Classification Search .................. 370/241, 370/242, 244–250, 252, 253, 310–312, 328; 709/227–229
See application file for complete search history.

(56) References Cited

U.S. PATENT DOCUMENTS

| | | | | |
|---|---|---|---|---|
| 7,031,274 | B2 * | 4/2006 | Sherman | 370/321 |
| 7,251,235 | B2 * | 7/2007 | Wentink | 370/338 |
| 7,561,546 | B2 * | 7/2009 | Marinier et al. | 370/329 |
| 7,643,451 | B2 * | 1/2010 | He et al. | 370/331 |
| 7,649,848 | B1 | 1/2010 | Swan et al. | |
| 8,085,710 | B2 * | 12/2011 | Kumar et al. | 370/328 |
| 2005/0197118 | A1 | 9/2005 | Mitchell | |
| 2008/0005156 | A1 | 1/2008 | Edwards et al. | |
| 2008/0014997 | A1 | 1/2008 | Guthrie et al. | |
| 2008/0049787 | A1 | 2/2008 | McNaughton et al. | |
| 2008/0080414 | A1 | 4/2008 | Thubert et al. | |
| 2008/0084334 | A1 | 4/2008 | Ballew | |
| 2008/0086320 | A1 | 4/2008 | Ballew et al. | |
| 2008/0086508 | A1 | 4/2008 | Ballew | |
| 2008/0090575 | A1 | 4/2008 | Barak et al. | |
| 2009/0177746 | A1 * | 7/2009 | Washio et al. | 709/206 |
| 2009/0310555 | A1 | 12/2009 | Huo et al. | |
| 2010/0138549 | A1 * | 6/2010 | Goel et al. | 709/228 |
| 2012/0051237 | A1 * | 3/2012 | Sun et al. | 370/252 |

OTHER PUBLICATIONS

U.S. Appl. No. 13/182,754, filed Jul. 14, 2011.

* cited by examiner

*Primary Examiner* — Dmitry H Levitan

(57) ABSTRACT

What is disclosed is a method of operating a wireless local area network (WLAN) access point. The method includes providing the WLAN for a user device to access a packet network, where the user device receives requested content transferred over the packet network through the WLAN access point. The method also includes receiving a message for delivery to the user device from a local interface of the WLAN access point, and in response to receiving the message for delivery to the user device, inhibiting transfer of the requested content received over the packet network to the user device. The method also includes transferring the message to the user device using addressing information associated with the requested content, and in response to receiving a confirmation of the message from the user device, resuming transfer of the requested content to the user device.

20 Claims, 6 Drawing Sheets

TRANSFER OF MESSAGES TO USER DEVICES OF A WIRELESS LOCAL AREA NETWORK ACCESS POINT

TECHNICAL FIELD

Aspects of the disclosure are related to the field of computer networks and communications, and in particular, message delivery to user devices of a wireless local-area network access point.

TECHNICAL BACKGROUND

Wireless user devices, such as computers, smartphones, gaming devices, or other devices, are typically able to connect to communication services, such as Internet services, through wireless access point devices. These access points provide a wireless local area network for the user devices to communicate with the access points and also to access communication services. Wired local area networks can include Ethernet networks, among other examples, and wireless local area networks can include Wi-Fi-style local area wireless networks, among other examples. Access points can include router, gateway, or bridge functionality to connect user devices on the provided local area networks to other networks and systems, such as the Internet or other packet networks. In some examples, access points also include radio equipment for bridging communications of the local area network through a second wireless communication system, such as through a base station of a cellular communication system.

OVERVIEW

What is disclosed is a method of operating a wireless local area network (WLAN) access point. The method includes providing the WLAN for a user device to access a packet network, where the user device receives requested content transferred over the packet network through the WLAN access point. The method also includes receiving a message for delivery to the user device from a local interface of the WLAN access point, and in response to receiving the message for delivery to the user device, inhibiting transfer of the requested content received over the packet network to the user device. The method also includes transferring the message to the user device using addressing information associated with the requested content, and in response to receiving a confirmation of the message from the user device, resuming transfer of the requested content to the user device.

What is also disclosed is a wireless local area network (WLAN) access point. The WLAN access point includes a WLAN interface configured to provide the WLAN for a user device to access a packet network, where the user device receives requested content transferred over the packet network through the WLAN access point. The WLAN access point also includes a local interface of the WLAN access point configured to receive a message for delivery to the user device, and in response to receiving the message for delivery to the user device, the WLAN interface is configured to inhibit transfer of the requested content received over the packet network to the user device. The WLAN interface is configured to transfer the message to the user device using addressing information associated with the requested content, and receive a confirmation of the message from the user device, and in response to the confirmation of the message, resume transfer of the requested content to the user device.

What is also disclosed is a method of operating a wireless local area network (WLAN) access point. The method includes providing the WLAN for a user device to access a packet network, where the user device receives requested content transferred over the packet network through the WLAN access point. The method also includes processing device status of the WLAN access point to determine a message for delivery to the user device, and in response to determining the message for delivery to the user device, inhibiting transfer of the requested content received over the packet network to the user device. The method also includes transferring the message to the user device using addressing information associated with the requested content, and in response to receiving a confirmation of the message from the user device, resuming transfer of the requested content to the user device.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
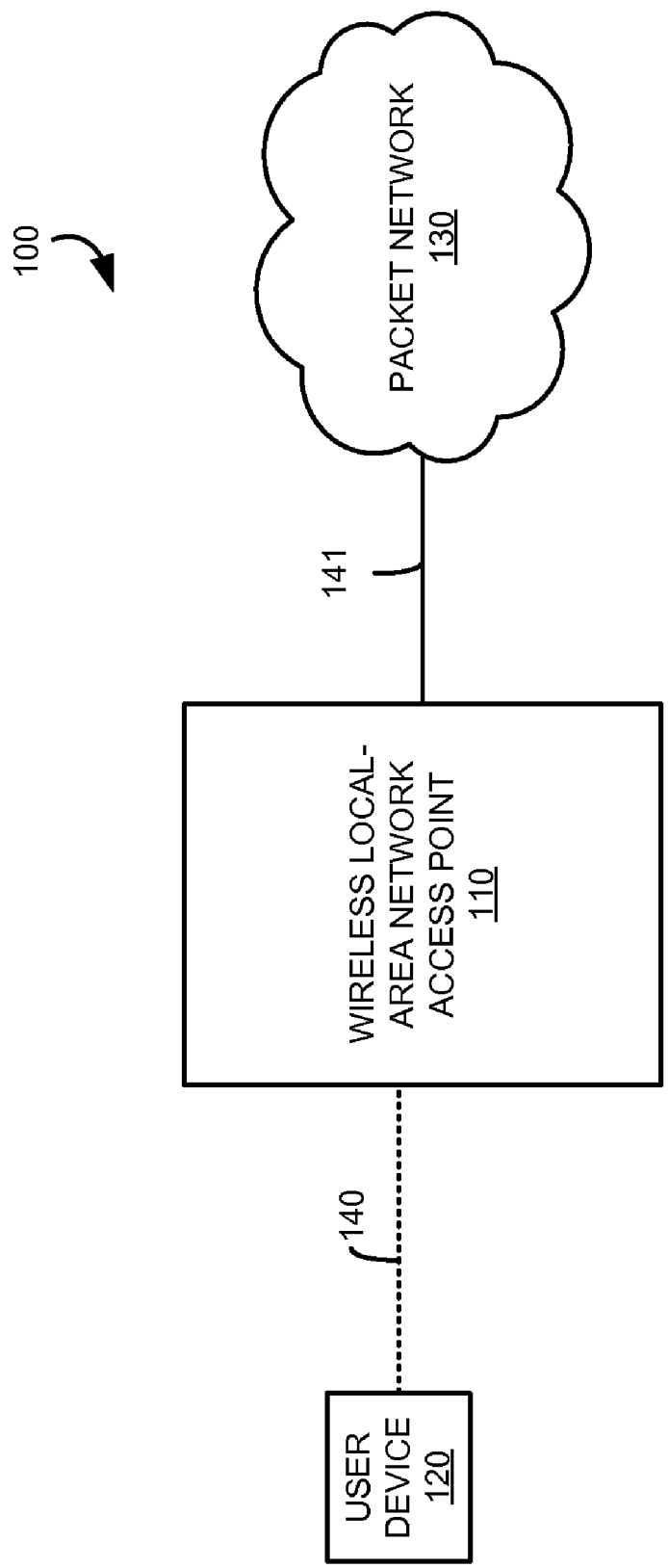
FIG. 1 is a system diagram illustrating a communication system.

FIG. 1 is a system diagram illustrating communication system 100. Communication system 100 includes wireless local area network access point 110 (hereinafter WLAN access point 110), user device 120, and packet network 130. User device 120 and WLAN access point 110 communicate over wireless link 140. Packet network 130 and WLAN access point 110 communicate over link 141. In the example shown in FIG. 1, WLAN access point 110 can provide a wireless local area network for user devices, such as user device 120. Through WLAN access point 110, user device 120 can access communication services of packet network 130, or communicate over packet network 130. Although one user device is shown in FIG. 1, it should be understood that a different number of user devices could be included.

Figure 2:
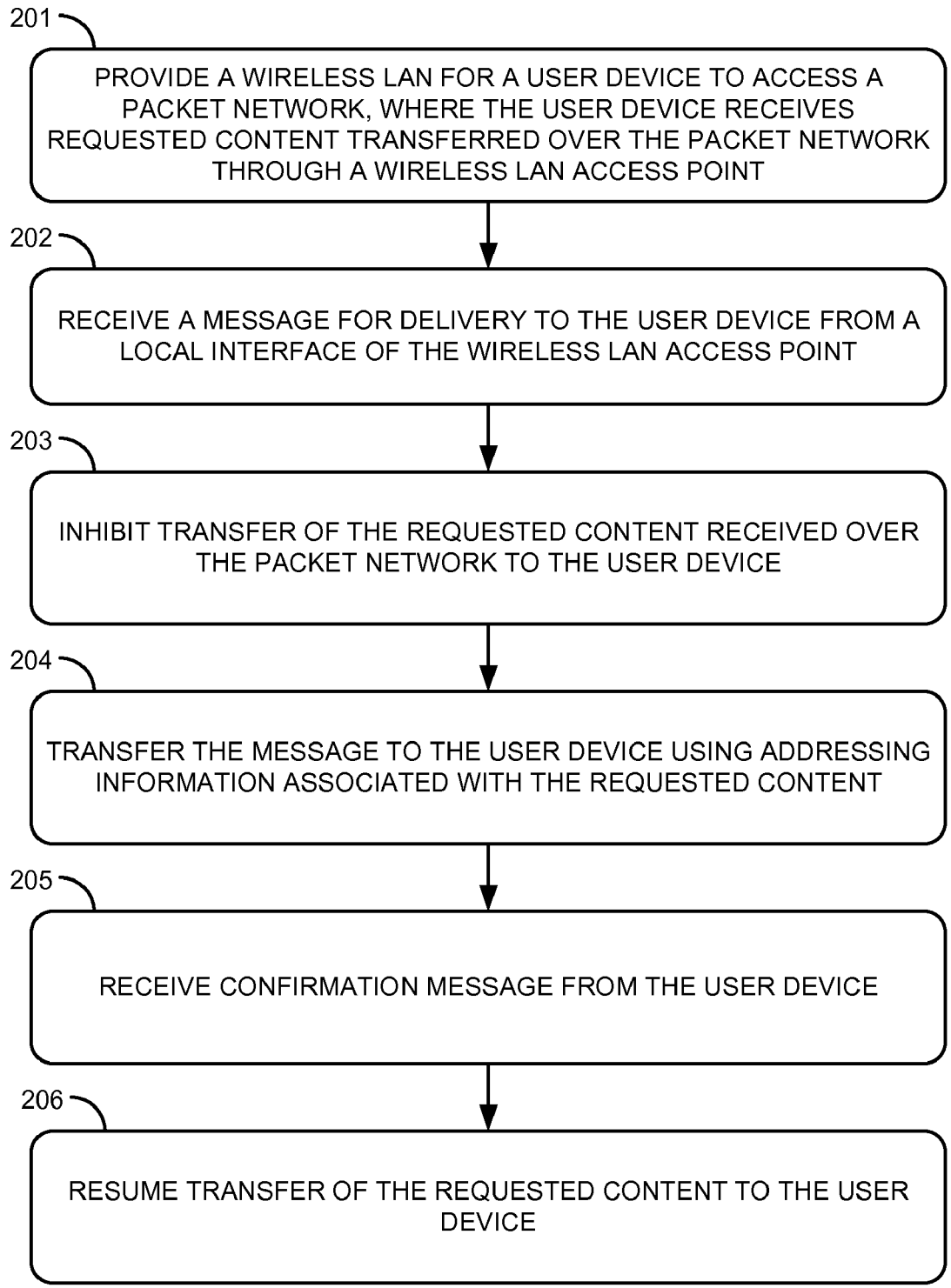
FIG. 2 is a flow diagram illustrating a method of operation of a wireless local-area network access point.

FIG. 2 is a flow diagram illustrating a method of operation of wireless local-area network access point 110. The operations in FIG. 2 are referenced herein parenthetically. In FIG. 2, WLAN access point 110 provides (201) a wireless local area network for user device 120 to access packet network 130, where user device 120 receives requested content transferred over packet network 130 through WLAN access point 110. The wireless local area network provided over wireless link 140 could comprise an IEEE 802.11 wireless local area network, although other wireless local area networks could be employed. User device 120 requests content over wireless link 140 through WLAN access point 110. The requested content could be for communication services over packet network 130, such as web applications, web pages, data transfer, voice over packet calls, video, or audio, among other user communications. Packet network 130 or systems communicating over packet network 130 transfer the requested content for delivery to user device 120. The requested content is received over link 141 from packet network 130 by WLAN access point 110 for delivery to user device 120, and link 141 could include further systems, equipment, or links.

WLAN access point 110 receives (202) a message for delivery to user device 120 form a local interface of WLAN access point 110. The local interface of WLAN access point 110 could include the wireless local area network provided by WLAN access point 110. In other examples, a user interface of WLAN access point 110 receives the message. The message could be received over the wireless local area network from another user device, or could be entered into a user interface of WLAN access point 110 by an operator of WLAN access point 110. In further examples, WLAN access point 110 determines the message based on equipment or device status of WLAN access point 110. The message could comprise text or a graphical message, such as an announcement, emergency notification, web page, data content, or other notification for user device 120, and could include information which indicates user device 120 is an intended recipient of the message, such as addressing information, destination indicators, a network identifier, or other destination information.

In response to receiving the message for delivery to user device 120, WLAN access point 110 inhibits (203) transfer of the requested content received over packet network 130 to user device 120. As discussed in operation 201, content requested by user device 120 is transferred by WLAN access point 110 to user device 120 over wireless link 140. In this example, the requested content is transferred by packet network 130 and is received by WLAN access point 110, and could include content which is transferred over a period of time, such as streaming content, data downloads, or web page content, among other content. In some examples, this content is formatted into a packet format, such as a packet format employed over wireless link 140 or link 141. The requested content is received by WLAN access point 110 and inhibited from transfer to user device 120 in response to WLAN access point 110 receiving the message for delivery to user device 120. In some examples, inhibiting the transfer of the requested content includes halting transfer of the requested content to user device 120. In further examples, WLAN access point 110 buffers the requested content as received during the inhibit process. In yet further examples, WLAN access point 110 could transfer a pause or hold message for delivery to the equipment or systems originating the requested content over packet network 130 to indicate that the originating equipment or systems should pause transfer of the requested content.

WLAN access point 110 transfers (204) the message to user device 120 using addressing information associated with the requested content. WLAN access point 110 transfers the message over wireless link 140. The content received by WLAN access point 110 for delivery to user device 120 in this example includes addressing information to indicate delivery to user device 120. This addressing information could include header information of packets transferred by packet network 130, network addressing information associated with the requested content or user device 120, a network address associated with systems or equipment originating the requested content, among other addressing information associated with the requested content. WLAN access point 110 could create a packet or packets which include the message for delivery to user device 120, and include the addressing information into the packet or packets. The message could also be encapsulated into traffic addressed for delivery to user device 120 by WLAN access point 110.

WLAN access point 110 receives (205) a confirmation message from user device 120. User device 120 receives a message transferred by WLAN access point 110 over wireless link 140, and responsively transfers a confirmation message over wireless link 140 to WLAN access point 110. The confirmation message could include addressing information associated with the requested content, such as equipment or systems which originated the requested content, or could include addressing information associated with WLAN access point 110, among other configurations. The confirmation message could also be included in a confirmation packet or packets for transfer over wireless link 140.

In response to receiving the confirmation message, WLAN access point 110 resumes transfer (206) of the requested content to user device 120. As discussed in operation 203, WLAN access point 110 inhibits transfer of the requested content during the message transfer and confirmation process. Once the confirmation message is received by WLAN access point 110, WLAN access point 110 resumes transfer of the requested content received over link 141 and packet network 130 for delivery to user device 120. In examples where the requested content is interrupted and not buffered in WLAN access point 110, the requested content may have missing data which is dropped during the inhibit process. In other examples where the requested content is buffered in WLAN access point 110, the buffered requested content could be transferred to user device 120.

Figure 3:
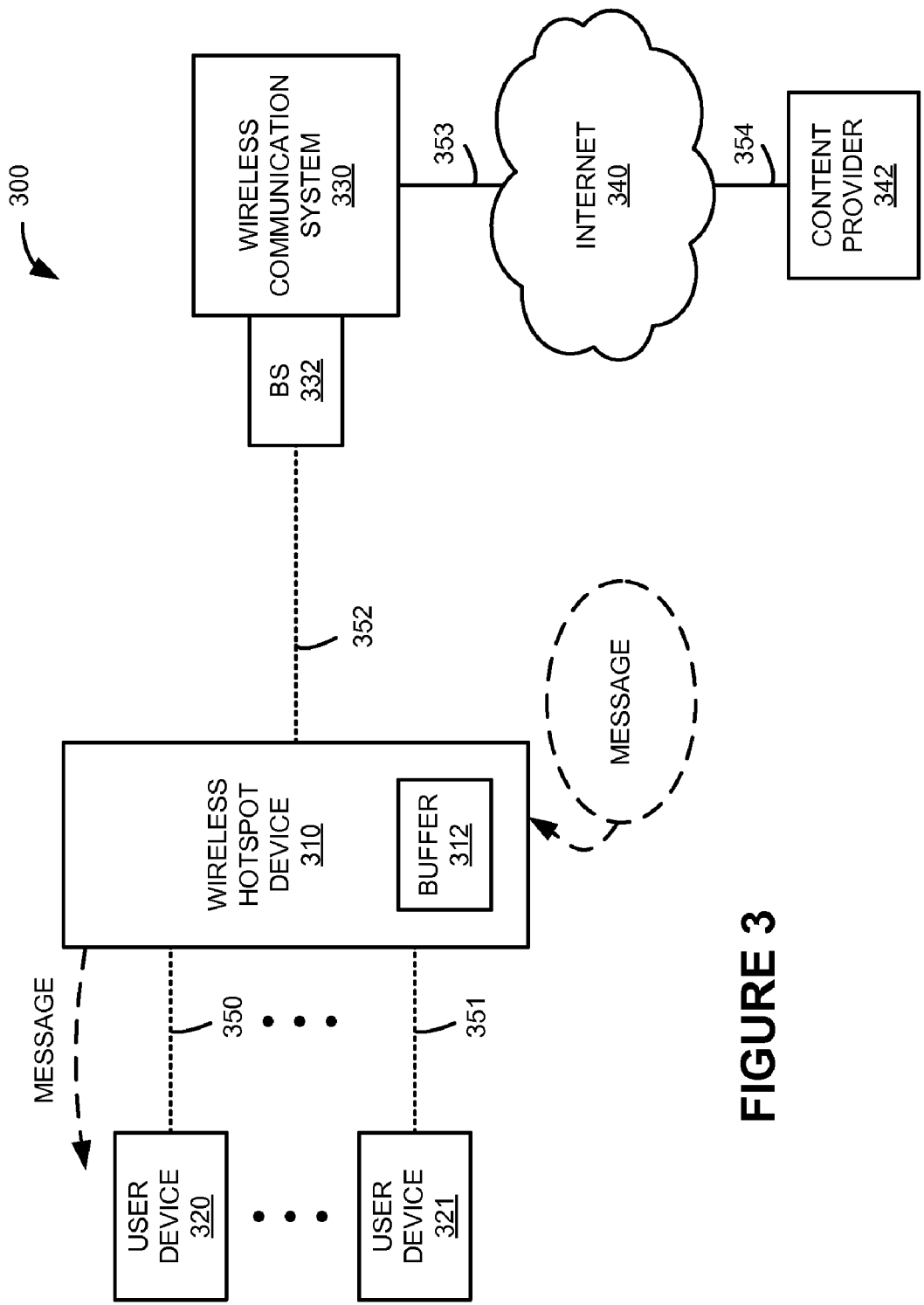
FIG. 3 is a system diagram illustrating a communication system.

FIG. 3 is a system diagram illustrating communication system 300. Communication system 300 includes wireless hotspot device 310, user devices 320-321, wireless communication system 330, base station (BS) 332, Internet 340, and content provider 342. Wireless hotspot device 310 and user devices 320-321 communicate over wireless links 350-351, respectively. In this example, wireless links 350-351 comprise an IEEE 802.11 wireless local area network (LAN), such as a Wireless Fidelity (Wi-Fi) network. Although individual wireless links 350-351 are shown, it should be understood that these links are merely representative of wireless local area network communications between user devices 320-321 and wireless hotspot device 310. Also, although two user devices 320-321 are shown in FIG. 3, it should be understood that a different number of user devices could be included. Wireless hotspot device 310 and base station 332 communicate over wireless link 352. In this example, wireless link 352 comprises an Evolution Data Optimized (EVDO) link for exchanging user communications associated with user devices 320-321, and could also include single-carrier radio transmission technology link (1xRTT) portions for exchanging overhead communications associated with wireless link 352. Wireless communication network 330 and Internet 340 communicate over link 353. In this example, link 353 is a metropolitan-area network (MAN) optical link. Content provider 342 and Internet 340 communicate over link 354. In this example, link 354 is a metropolitan-area network (MAN) optical link.

In FIG. 3, wireless hotspot device 310 includes transceiver equipment to provide a wireless LAN, associated with wireless links 350-351, to user devices, such as user devices 320-321. Wireless hotspot device 310 also includes transceiver equipment to communicate over a cellular communication link, such as with base station 332 of wireless communication system 330 over wireless link 352. Wireless hotspot device 310 includes network routing and gateway equipment for exchanging communications over the wireless LAN and routing LAN communications over wireless link 352 for delivery over Internet 340. Wireless hotspot device 310 also includes processing systems for providing the wireless LAN, communicating over wireless link 352, receiving or determining messages for delivery to user devices, and inhibiting or resuming content transfer to user devices, among other operations. Wireless hotspot device 310 could contain application programs, firmware, or some other form of computer-readable processing instructions. In FIG. 3, wireless hotspot device 310 also includes buffer 312. Buffer 312 includes a computer-readable medium for storing content received over wireless link 352 for delivery to user devices 320-321. Buffer 312 comprises a computer-readable medium such as a disk, integrated circuit, server, tape, or some other memory device, and also may be distributed among multiple memory devices. Wireless hotspot device 310 may include a database, operating system, logs, utilities, drivers, networking software, and other software typically loaded onto a computer system.

User devices 320-321 each comprise user computing devices in this example, and could each comprise a computer, wireless smartphone, gaming device, or other user equipment capable of communicating over a wireless LAN. Each of user devices 320-321 can request content via the wireless LAN provided by wireless hotspot device 310, such as requesting content provided by content provider 342 over Internet 340, or from other systems.

Base station 332 comprises RF communication and control circuitry, antenna elements, and communication routing equipment and systems. The RF communication circuitry typically includes amplifiers, filters, RF modulators, transceivers, and signal processing circuitry. Base station 332 also includes equipment to communicate with wireless communication devices, such as wireless hotspot device 310 or other wireless communication devices, over wireless link 352. Base station 332 may route communications between wireless communication system 330 and wireless communication devices such as wireless hotspot device 310, receive registration requests from wireless communication devices to establish wireless links, or provide network information, handoff information, or configuration information to wireless communication devices, among other operations.

Wireless communication system 330 includes equipment, including base station 332, to provide wireless access to communication services within different geographic coverage areas to wireless communication devices and route communications of the communication services to and from wireless communication devices through base stations. Wireless communication system 330 may also comprise further base stations, base transceiver stations (BTS), base station controllers (BSC), mobile switching centers (MSC), radio node controllers (RNC), call processing systems, authentication, authorization and accounting (AAA) equipment, access service network gateways (ASN-GW), packet data switching nodes (PDSN), home agents (HA), General Packet Radio Service (GPRS) support nodes, Internet access nodes, telephony service nodes, wireless data access points, or other wireless communication equipment.

Internet 340 includes packet networks, communication links, routers, gateways, and other associated equipment for routing packet communications, such as Internet protocol (IP) packets, between different endpoints. Additional systems and equipment could communicate through Internet 340, such as content providers, application service providers, web content providers, streaming media providers, voice over packet providers, among other communication service providers and content providers. Packet communications transferred by the various endpoints, such as content provider 342, are transferred by Internet 340 for delivery to destinations associated with the packets.

Content provider 342 includes computer systems and computer readable storage media to provide content, as requested by user devices, for delivery over Internet 340. The content could be encapsulated into packets appropriate for transfer over Internet 340, such as IP packets. Content provider 342 may include equipment to communicate with user devices over Internet 340 and other intermediary systems by establishing packet links between the user devices and content provider 342. In further examples, content provider 342 comprises a user device. Example content could include video streams, audio streams, email, web pages, voice communications, or other content.

Figure 4:
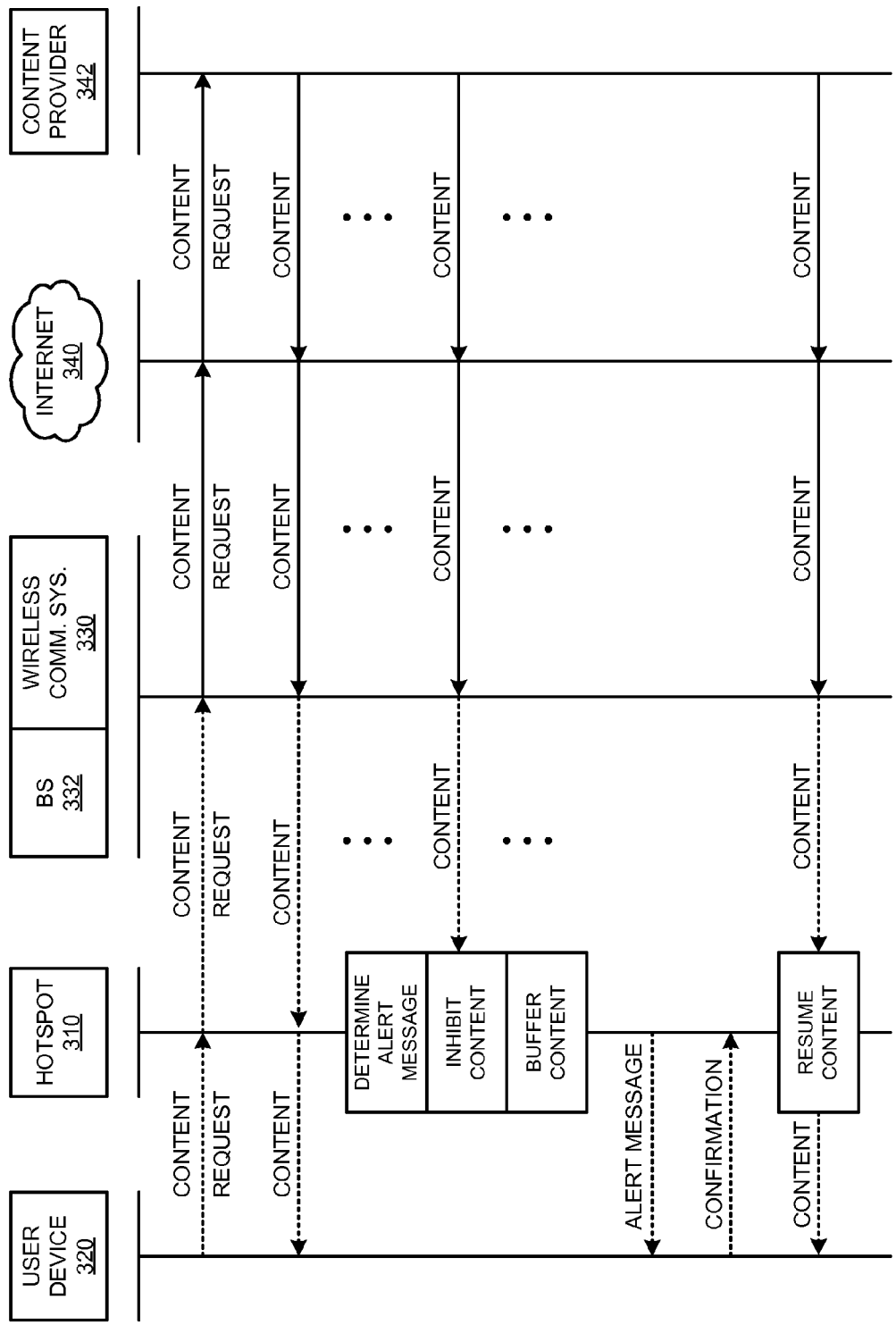
FIG. 4 is a sequence diagram illustrating a method of operation of a wireless hotspot device.

FIG. 4 is a sequence diagram illustrating a method of operation of communication system 300. In FIG. 4, user device 320 transfers a content request for content of content provider 342 over wireless link 350. In this example, wireless link 350 represents a wireless LAN link, and the content request is transferred over the wireless LAN by user device 320. Wireless hotspot device 310 (hereinafter hotspot 310) receives this content request over the wireless LAN and transfers the content request for delivery to content provider 342. Hotspot 310 receives access to Internet 340 over a wireless link provided by base station 332 of wireless communication system 330 in this example, namely EVDO link 352. Thus, the content request is transferred over EVDO link 352. Base station 332 forwards this content request over wireless communication system 330, and through Internet 340, for delivery to content provider 342. Although not shown in FIG. 3 for clarity, packet communications exchanged by base station 332 could be routed by equipment and systems of wireless communication system 330, such as packet processing nodes, access service network gateways (ASN-GW), packet data switching nodes (PDSN), home agents (HA), General Packet Radio Service (GPRS) support nodes, among other equipment and systems. In some examples, base station 332 and wireless communication system 330 communicate over a backhaul link, such as a T1 link.

Once the content request is received by content provider 342, then content provider 342 transfers content for delivery to user device 320. This content is typically responsive to the content request, and could include web application data, web pages, data transfer, voice over packet calls, video, or audio, among other user communications. The content is transferred over Internet 340 by content provider 342, and received by wireless communication system 330. Base station 332 of wireless communication system 330 transfers the content over EVDO link 352 to hotspot 310. Hotspot 310 transfers the content over the wireless LAN for delivery to user device 320. Throughout the transit of the content from content provider 342 to user device 320, additional systems and equipment may be involved in the routing and transfer of the content. Additionally, the content is incorporated into packets, such as IP packets, transferred by content provider 342, although other packet formats and protocols may be employed. The content is transferred over a period of time in FIG. 4, as indicated by the vertical ellipses after the initial content transfer. It should be understood that user device 321 could also be involved in a content request or content receipt process with content provider 342 or another content provider.

During the transfer of the content, hotspot 310 determines a message for delivery to user device 320. In this example, the message is determined by hotspot 310 as an alert message based on device status of hotspot 310. Hotspot 310 could include a battery and associated power circuitry to provide power for hotspot 310, such as when hotspot 310 is a portable device. Hotspot 310 could also include radio-frequency (RF) signal strength determining circuitry. Hotspot 310 could also include hours of operation of hotspot 310 stored on a computer readable medium therein. Other functionality or circuitry could be included in hotspot 310 from which a device status could be derived. The device status which triggers an alert message for delivery to user device 320 could be based on the various functionality or circuitry included in hotspot 310. For example, when a battery of hotspot 310 reaches a low power status, an alert message could be determined which will alert user devices, communicating on the wireless LAN provided by hotspot 310, to the battery status. User devices could then take appropriate action, such as disconnecting from the wireless LAN, powering down, or determining alternate network access devices, among other actions. In another example, hotspot 310 could be associated with a local business, such as a coffee shop which has associated hours of operation. Hotspot 310 could determine a current time of day and process the hours of operation stored on a computer readable medium therein, and determine an alert message indicating the wireless LAN access would be ended within a period of time. Additionally, an operator of hotspot 310 could determine an alert message for delivery to user devices associated with hotspot 310. The operator interacts with hotspot 310 over a local interface, where the local interface could include another user device communicating on the wireless LAN provided by hotspot 310, or could include a human interface device on hotspot 310, among other local interfaces. The message could comprise text or a graphical message, such as an announcement, emergency notification, or other notifications for user devices, and could include information which indicates which user devices are intended recipients of the message, such as addressing information, destination indicators, a network identifier, or other destination information. Hotspot 310 could format the message into a format appropriate for transfer to user devices on the wireless LAN, such as a packet format, IP packet format, transmission control protocol (TCP) packet format, Ethernet data format, web page, javascript format, or hypertext markup language (HTML) format, among other formats.

In response to determining the alert message for delivery to user device 320, hotspot 310 inhibits transfer of the requested content received over Internet 340 and wireless communication system 330 for delivery to user device 320. In this example, inhibiting the transfer of the requested content includes halting transfer of the requested content to user device 320. Hotspot 310 also buffers the requested content received during the inhibit process by storing the content in buffer 312. In further examples, the alert message could be transferred to multiple user devices concurrently, such as using multicast packets or individually inhibiting content transfer to each user device and transferring separate alert messages to each user device. Hotspot 310 transfers the alert message over wireless link 350. Hotspot 310 transfers the alert message to user device 320 using addressing information associated with the requested content. In this example, the alert message is transferred using a packet or packets generated by hotspot 310. The packets include destination addressing information to indicate delivery to user device 320, and include source addressing information associated with the content transferred by content provider 342. Hotspot 310 creates these packets for the alert message and inserts the addressing information as the addressing portion of the headers of the packets.

User device 320 receives the alert message over wireless link 350 as transferred by hotspot 310, and responsively transfers a confirmation message over wireless link 350 to hotspot 310. Hotspot 310 receives the confirmation message from user device 320. The confirmation message could comprise a packet or packets which includes destination addressing information associated with the content provider 342, and source addressing information associated with user device 320. Hotspot 310 intercepts these packets associated with the confirmation message and prevents transfer of the confirmation message packets beyond hotspot 310. Receipt of the confirmation message indicates to hotspot 310 that the alert message was received by user device 320. The confirmation message could comprise a TCP acknowledge packet or packets transferred by user device 320 in response to receiving the alert message packets, a confirmation message generated in response to the alert message or contents of the alert message, among other formats. In further examples, the alert message comprises Internet packets, such as IP packets or TCP packets, for communicating web content to user device 320, such as using the hypertext transfer protocol (HTTP). The web content could be received by user device 320 and rendered into a web page by a browser application of user device 320. The web page could include a confirmation user interface element, such as a button, click-through content notification, or other active confirmation element to receive feedback from a user of user device 320. The web page could also include content comprising the alert information about the device status, hours of operation, among other information transferred in the alert message.

In response to receiving the confirmation message, hotspot 310 resumes transfer of the requested content to user device 320. As discussed in above, hotspot 310 inhibits transfer of the requested content during the message transfer and confirmation process, and buffers any of the requested content received into hotspot 310 transferred by content provider 342. Once the confirmation message is received, hotspot 310 resumes transfer of the requested content transferred by content provider 342, beginning with the buffered content of buffer 312. Once the buffered content has been transferred to user device 320, further received content transferred by content provider 342 would be transferred to user device 320.

Figure 5:
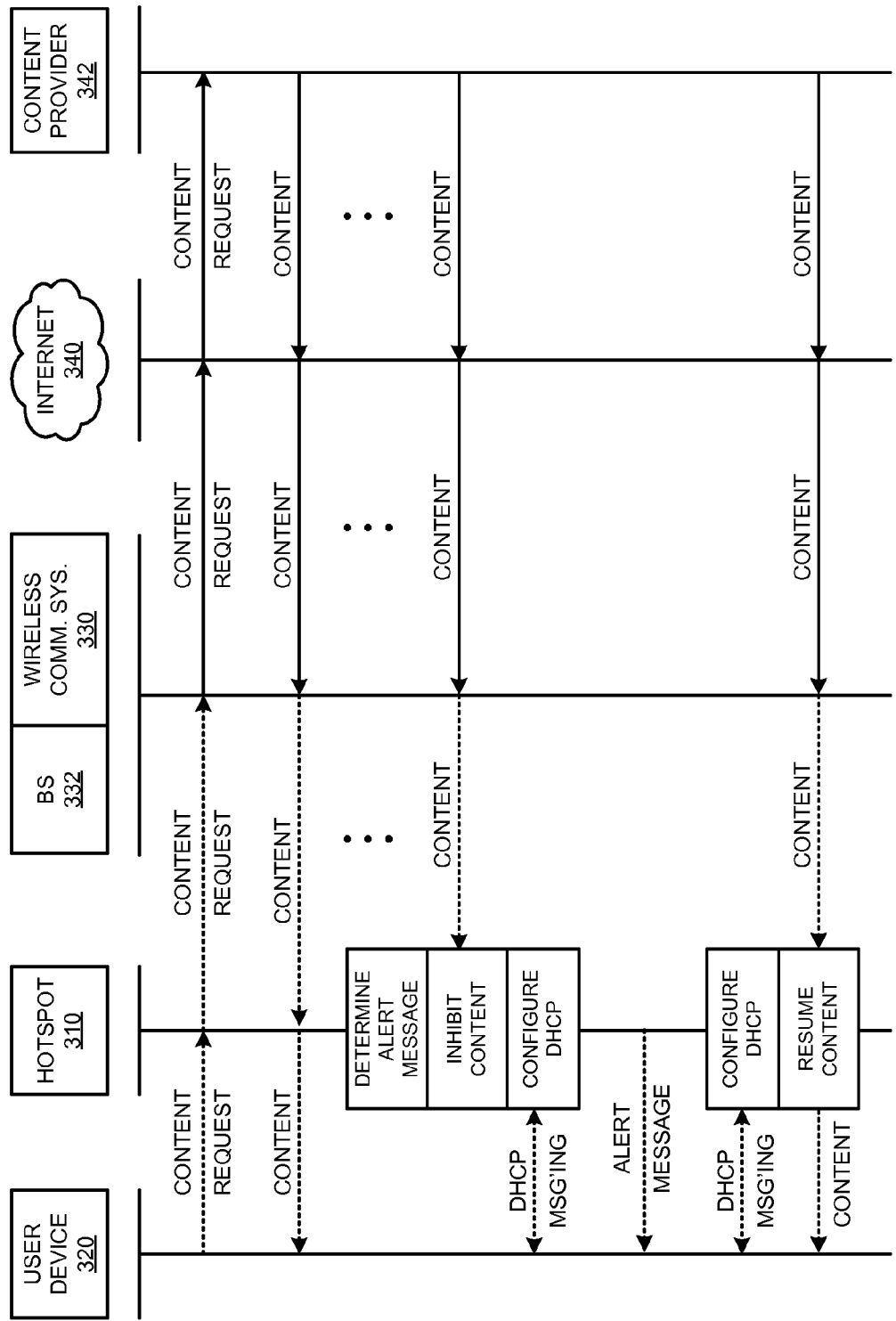
FIG. 5 is a sequence diagram illustrating a method of operation of a wireless hotspot device.

FIG. 5 is a sequence diagram illustrating a method of operation of communication system 300. In FIG. 5, user device 320 transfers a content request for content of content provider 342 over wireless link 350. In this example, wireless link 350 represents a wireless LAN link, and the content request is transferred over the wireless LAN by user device 320. Wireless hotspot device 310 (hereinafter hotspot 310) receives this content request over the wireless LAN and transfers the content request for delivery to content provider 342. Hotspot 310 receives access to Internet 340 over a wireless link provided by base station 332 of wireless communication system 330 in this example, namely EVDO link 352. Thus, the content request is transferred over EVDO link 352. Base station 332 forwards this content request over wireless communication system 330, and through Internet 340, for delivery to content provider 342.

Once the content request is received by content provider 342, then content provider 342 transfers content for delivery to user device 320. This content is typically responsive to the content request, and could include web application data, web pages, data transfer, voice over packet calls, video, or audio, among other user communications. The content is transferred over Internet 340 by content provider 342, and received by wireless communication system 330. Base station 332 of wireless communication system 330 transfers the content over EVDO link 352 to hotspot 310. Hotspot 310 transfers the content over the wireless LAN for delivery to user device 320. Throughout the transit of the content from content provider 342 to user device 320, additional systems and equipment may be involved in the routing and transfer of the content. Additionally, the content is incorporated into packets, such as IP packets, transferred by content provider 342, although other packet formats and protocols may be employed. The content is transferred over a period of time in FIG. 5, as indicated by the vertical ellipses after the initial content transfer. It should be understood that user device 321 could also be involved in a content request or content receipt process with content provider 342 or another content provider.

In this example, providing the wireless LAN for user device 320 includes transferring first network configuration message to user device 320 to establish a first network configuration between hotspot 310 and user device 320. The first network configuration could include determining an Internet protocol (IP) address for user device 320 through a Dynamic Host Configuration Protocol (DHCP) configuration process, and providing wireless access to communication services for user device 320 based on the first network configuration message or first IP address. The first network configuration could be then used by user device 320 when requesting content from content provider 342. In some examples, hotspot 310 could also modify a first IP address associated with user device 320 to a different IP address when routing communications to systems over Internet 340, and use a local pool of IP addresses which includes the first IP address for user devices on the wireless LAN associated with hotspot 310. The received content, as requested by user device 320, is transferred by hotspot 310 to user device 320 using the first network configuration.

During the transfer of the content, hotspot 310 determines a message for delivery to user device 320. In this example, the message is determined by hotspot 310 as an alert message based on hours of operation of hotspot 310. Hotspot 310 could include a listing of the hours of operation of hotspot 310 stored on a computer readable medium therein, such as when hotspot 310 provides a wireless LAN for a limited-hours business. Hotspot 310 determines a current time of day and processes the hours of operation stored on the computer readable medium therein, and determines an alert message indicating the wireless LAN access will be ended within a period of time. In this example, hotspot 310 formats the message into a web page format appropriate for transfer to user devices on the wireless LAN.

In response to determining the alert message for delivery to user device 320, hotspot 310 inhibits transfer of the requested content received over Internet 340 and wireless communication system 330 for delivery to user device 320. In this example, inhibiting the transfer of the requested content includes halting transfer of the requested content to user device 320. In some examples, the alert message could be transferred to multiple user devices concurrently, such as using multicast packets or individually inhibiting content transfer to each user device and transferring separate alert messages to each user device. In further examples, inhibiting transfer of requested content to user device 320 could include intercepting and suppressing packet acknowledgement messages transferred by user device 320 for the requested content. In yet further examples, hotspot 310 could transfer a pause or hold message to content provider 342 using addressing information associated with the requested content, such as addressing information associated with user device 320. Hotspot 310 may process the content delivered to user device 320, such as packets or overhead messaging associated with the content, to determine addressing information, content type, or other information about the content transferred by content provider 342, or content request information transferred by user device 320.

Also in response to determining the alert message for delivery to user device 320, hotspot 310 determines a second network configuration message for user device 320, where the second network configuration message establishes a second network configuration between hotspot 310 and user device 320. This second network configuration could establish a second IP address for user device 320. In this example, the alert message for user device 320 is transferred using the second network configuration. The second network configuration could include determining a second IP address for user device 320 through a DHCP configuration process, and providing wireless access to communication services for user device 320 based on the second network configuration message or second IP address.

Once the second network configuration is established for user device 320, the alert message is transferred to user device 320. In some examples, hotspot 310 generates web content comprising the alert message, such as a web page which includes the alert message. The web page is served by hotspot 310 using the second network configuration. For example, the web page could be served by monitoring for content requests which include the second IP address from user device 320 and responsively transferring the web content to user device 320. The monitored content requests could include content requests for content of content provider 342 or other content providers, and hotspot 310 could intercept these content requests by not transferring the content requests for delivery to the associated content provider and instead transferring the web content comprising the alert message in response to the content request from user device 320. For example, user device 320 could transfer a request for content for delivery to content provider 342 using the second network configuration, and hotspot 310 could prevent transfer of the content request for delivery to content provider 342 and responsively transfer the alert message to user device 320 using a web page generated by hotspot 310 or an operator of hotspot 310. The content request could be transferred by user device 320 in response to a user action of user device 320, such as clicking a link in a web browser, requesting streaming media content, requesting a file transfer, or establishing a web browser session, among other user actions. The content comprising the web alert message could include automated portions, such as including a web page redirect instruction, script, or web page reload instruction. The automated portions could initiate a further network configuration process with hotspot 310, transfer a confirmation message to hotspot 310, or redirect a current web page to another web page comprising further alert information, among other operations. The content request prevented from transfer by hotspot 310 could be buffered in buffer 312 and transferred for delivery to content provider 342 after the alert message has been transferred to user device 320. Although web content, such as a web page, is discussed in this example, other types of content comprising the alert messages could be employed, such as streaming media, text messages, or file transfer protocol (FTP) messaging, among other application-level messaging and content types.

In other examples, such as when a DHCP configuration process is used to establish the first or second network configurations, the DHCP configuration process itself could be used to transfer the alert message within the DHCP configuration messaging. The DHCP process could be included in the inhibiting of content for delivery to user device 310. A DHCP configuration process typically includes messages exchanged between two devices, such as hotspot 310 and user device 320, where the messages can include discovery, offer, request, and acknowledge DHCP messages. Hotspot 310, acting as a DHCP server, could determine DHCP information associated with the DHCP messages for transfer to user device 320. Hotspot 310 could include the alert message in the DHCP messages used in the DHCP configuration process. For example, the alert message could be included in a DHCP offer or acknowledge message, such as within vendor-specific data fields of the DHCP messages. Other portions or data fields of the DHCP messages could be used to transfer the alert message. User device 320 may include instructions or software to interpret the alert messages included in DHCP configuration messages.

Although the second network configuration is used for transfer of the alert message to user device 320 in this example, in other examples, the first network configuration could be used to transfer the alert message to user device 320. For example, hotspot 310 could redirect content requests received from user device 320 to a different destination included within hotspot 310, such as a web server portion of hotspot 310. The web server portion of hotspot 310 could determine alternate content in response to the content request transferred by user device 320. The alternate content comprising the alert message could then be transferred in response to receiving a content request after an alert message has been determined by hotspot 310. The alternate content could comprise the alert message and be formatted in a data format of the content requested by user device 320. The alternate content could be transferred to user device 320 for display in a software application on user device 320 which is expecting the requested content in response to the content request. It should be understood that the alternate content example discussed above could also be employed in examples using a second network configuration.

User device 320 receives the alert message over wireless link 350 as transferred by hotspot 310. In some examples user device 320 responsively transfers a confirmation message over wireless link 350 to hotspot 310, while in other examples no configuration message is transferred by user device 320 and hotspot 310 assumes delivery of the alert message. If transferred, hotspot 310 receives the confirmation message from user device 320. In examples where web content is provided by hotspot 310 which comprises the alert message, further web content could accompany the alert message. The further content could include other information, such as device status information for hotspot 310, time and date information, usage information for user device 320, as well as interactive elements, such as confirmation buttons, billing request forms, or other interactive features. A web browser or other application used by user device 320 to issue the content requests could render the content comprising the alert message for display to the user of user device 320.

In examples where a second network configuration is employed, a further network configuration process could proceed to re-establish the first network configuration. After the first network configuration has been re-established, then further content requests could be transferred to content provider 342, and content transferred by content provider 342 for delivery to user device 320 could be transferred to user device 320 by hotspot 310, thus resuming transfer of the content. As discussed in above, hotspot 310 inhibits transfer of the requested content during the message transfer and optional confirmation process, and may buffer any of the requested content received into hotspot 310 transferred by content provider 342. Once the alert message is transferred, hotspot 310 resumes transfer of the requested content transferred by content provider 342, beginning with the buffered content. Once the buffered content has been transferred to user device 320, further received content transferred by content provider 342 would be transferred to user device 320. The buffered content could be stored in buffer 312 and subsequently retrieved from buffer 312.

Figure 6:
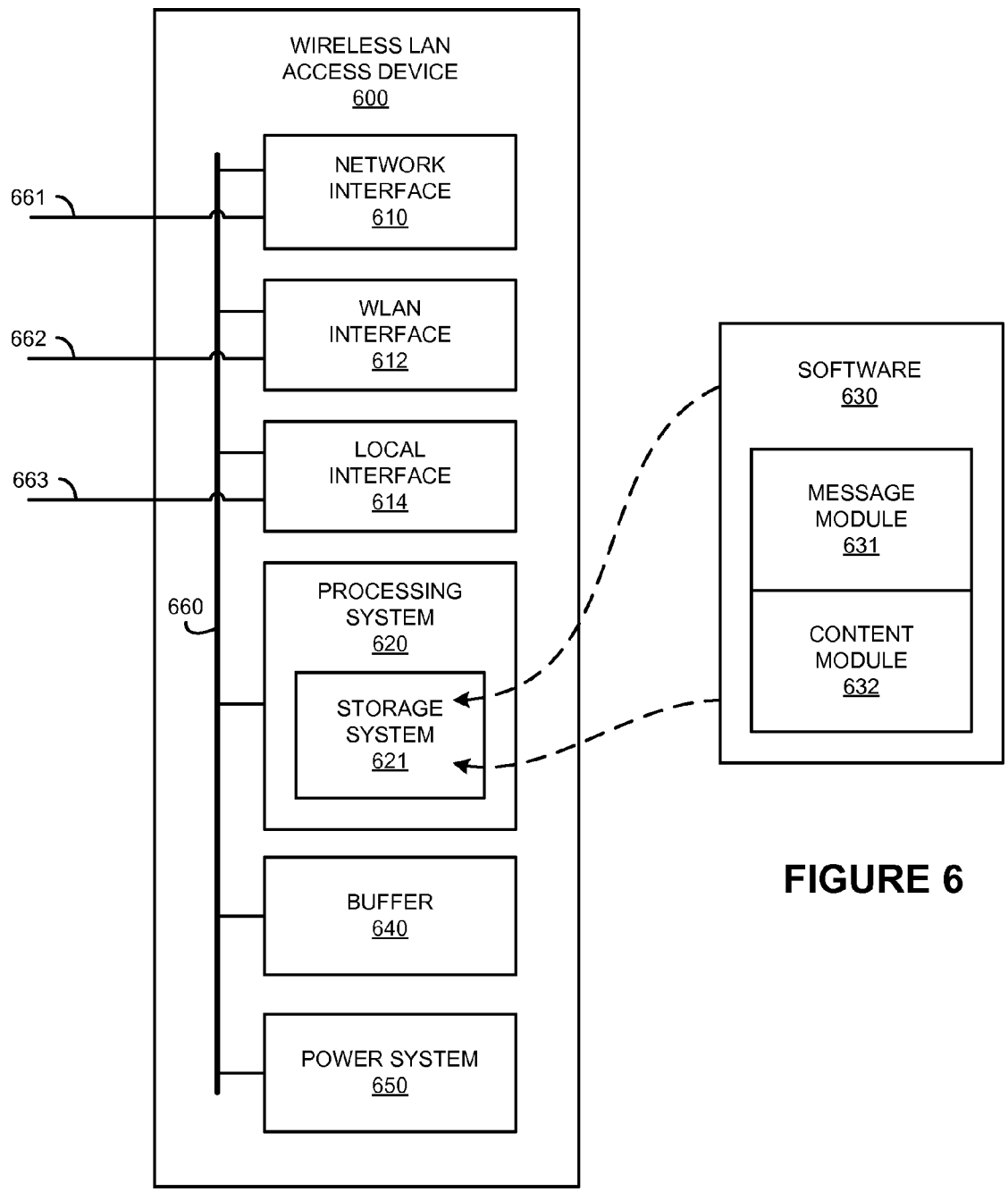
FIG. 6 is a block diagram illustrating a wireless local-area network access device.

FIG. 6 is a block diagram illustrating wireless local area network (LAN) access device 600, as an example of wireless local area network access point 110 found in FIG. 1 or wireless hotspot device 310 found in FIG. 3, although wireless local area network access point 110 or wireless hotspot device 310 could use other configurations. Wireless LAN access device 600 includes network interface 610, wireless local area network (WLAN) interface 612, local interface 614, processing system 620, buffer 640, and power system 650. Network interface 610, wireless LAN interface 612, local interface 614, processing system 620, buffer 640, and power system 650 communicate over bus 660. Wireless LAN access device 600 may be distributed among multiple devices that together form elements 610, 612, 614, 620-621, 630-632, 640, 650, and 660-663.

Network interface 610 comprises communication equipment for communicating over link 661, such as transferring content requests, receiving content, routing packet communications, communicating over a packet network, and communicating with a wireless communication system, among other equipment. In some examples, network interface 610 comprises a wireless communication device, such as a cellular data communication device, and includes RF communication and control circuitry, and antenna elements. Network interface 610 also receives command and control information and instructions from processing system 620 over bus 660. Link 661 could use various protocols or communication formats as described herein for links 141 or 352, including combinations, variations, or improvements thereof.

WLAN interface 612 comprises RF communication and control circuitry, antenna elements, and communication routing equipment and systems. The RF communication circuitry typically includes amplifiers, filters, RF modulators, transceivers, and signal processing circuitry. In many examples, WLAN interface 612 includes circuitry and equipment to provide a wireless local area network to user devices, route user communications between network interface 610 and user devices over wireless link 662 and bus 660, transfer messages to user devices, and inhibit transfer of content requested by user devices, among other operations. Wireless link 662 could use various protocols or communication formats as described herein for links 140 or 350-351, including combinations, variations, or improvements thereof.

Local interface 614 comprises an interface for a user or operator of wireless LAN access device 600 to transfer messages to wireless LAN access device 600. In some examples, local interface 614 is incorporated into the elements of WLAN interface 612, network interface 610, or processing system 620, and is configured to allow a user device communicating over wireless link 662 to transfer a message for delivery to other user devices. In other examples, local interface 614 includes a user interface system, such as a display, human input device, or other user interface to allow a user or operator to enter a message for delivery to user devices associated with wireless link 662. In further examples, local interface 614 provides a software or web-based user interface over link 663. A combination of software and human interface device interfaces could comprise local interface 614. Link 663 could be incorporated into wireless link 662 or link 661 in some examples, or comprise a portion of wireless link 662 or link 661. Link 663 could use various protocols or communication formats as described herein for links 140-141 or 350-352, including combinations, variations, or improvements thereof.

Processing system 620 includes storage system 621. Processing system 620 retrieves and executes software 630 from storage system 621. In some examples, processing system 620 is located within the same equipment in which network interface 610, wireless LAN interface 612, local interface 614, buffer 640, or power system 650 are located. In further examples, processing system 620 comprises specialized circuitry, and software 630 or storage system 621 could be included in the specialized circuitry to operate processing system 620 as described herein. Storage system 621 could include a computer-readable medium such as a disk, tape, integrated circuit, server, or some other memory device, and also may be distributed among multiple memory devices.

Software 630 may include an operating system, logs, utilities, drivers, networking software, and other software typically loaded onto a computer system. Software 630 could contain application programs, web server software, firmware, or some other form of computer-readable processing instructions. When executed by processing system 620, software 630 directs processing system 620 to operate as described herein, such as control a wireless LAN, control the various interfaces of wireless LAN access device 600, determine device status of wireless LAN access device 600, inhibit transfer of content to user devices, determine messages for delivery to user devices, and resume transfer of content to user devices, among other operations.

In this example, software 630 includes message module 631 and content module 632. It should be understood that a different configuration could be employed, and individual modules of software 630 could be included in different equipment than wireless LAN access device 600. Message module 631 determines messages for delivery to user devices associated with wireless LAN access device 600. In some examples, the messages are received from a user or operator over local interface 614. In other examples, message module 631 presents a user interface, such as a web interface using hypertext markup language (HTML), for local interface 614 to present to a user or operator. In further examples, message module 631 monitors device status or equipment status for wireless LAN access device 600 and determines messages for user devices based on the device or equipment status. For example, message module 631 could process status of power system 650, such as a battery level status, and determine a message based on the status. Message module 631 also formats the messages for delivery to user devices, such as packetizing, determining addresses for packets associated with the messages, or determining web page content to present the messages to user devices. Content module 632 communicates with message module 631 to determine when messages are ready for transfer to user devices. When messages are available for transfer to user devices, content module 632 identifies content currently being transferred to user devices which are recipients of the messages, and inhibits transfer of the content. Content module 632 also receives confirmation information from message module 631 to determine when to resume transfer of content after message delivery. The content could be buffered in buffer 640 for later transfer to user devices after the message has been successfully delivered to the user devices. In some examples, content module 632 determines addressing information associated with the content being transferred to user devices. The addressing information is then used by message module 631 to format messages using the addressing information. This addressing information could include content packet header information, such as network addressing information, which may include destination and source addressing information. Additionally, content module 632 could determine a content type of the content being transferred to user devices. This content type could be communicated to message module 631, where message module 631 formats the messages into a content type similar to the content type of the content being transferred to user devices.

Buffer 640 stores and retrieves content captured during content transfer inhibit operations of wireless LAN access device 600. Buffer 640 comprises a computer-readable medium such as a disk, tape, integrated circuit, server, or some other memory device, and also may be distributed among multiple memory devices. Buffer 640 may include a database, operating system, logs, utilities, drivers, networking software, and other software typically loaded onto a computer system. Buffer 640 could contain application programs, web server programs, firmware, or some other form of computer-readable processing instructions.

Power system 650 includes circuitry and a power source to provide power to the elements of wireless LAN access device 600. The power source could include a battery, solar cell, spring, flywheel, capacitor, thermoelectric generator, chemical power source, dynamo, or other power source. In some examples, power system 650 receives power from an external source, such as a wall outlet. Power system 650 also includes circuitry to condition, monitor, and distribute electrical power to the elements of wireless LAN access device 600.

Bus 660 comprises a physical, logical, or virtual communication link, capable of communicating data, control signals, power, and communications, along with other information. In some examples, bus 660 is encapsulated within the elements of network interface 610, wireless LAN interface 612, local interface 614, processing system 620, buffer 640, or power system 650, and may be a software or logical link, apart from the associated power elements. In other examples, bus 660 includes various communication media, such as air, space, metal, optical fiber, or some other signal propagation path, including combinations thereof. Bus 660 could be a direct link or might include various equipment, intermediate components, systems, and networks.

Referring back to FIG. 1, user device 120 comprises radio frequency (RF) communication circuitry and antenna elements. The RF communication circuitry typically includes amplifiers, filters, modulators, and signal processing circuitry. In many examples, user device 120 includes circuitry and equipment to exchange communications of wireless communication services over a wireless link, request content, and exchange control information for wireless access, among other operations. User device 120 may also include user interface systems, memory devices, computer-readable storage mediums, software, processing circuitry, or other communication components. User device 120 may be a wireless communication device, computer, subscriber equipment, customer equipment, access terminal, smartphone, mobile wireless telephone, e-book, mobile Internet appliance, wireless network interface card, media player, game console, or some other wireless communication apparatus, including combinations thereof.

Wireless local area network access point 110 comprises RF communication and control circuitry, antenna elements, and communication routing equipment and systems. The RF communication circuitry typically includes amplifiers, filters, RF modulators, transceivers, and signal processing circuitry. In many examples, wireless local area network access point 110 includes circuitry and equipment to provide a wireless local area network to user devices, route user communications between packet network 130 and user devices, transfer messages to user devices, inhibit transfer of content requested by user devices, among other operations. Wireless local area network access point 110 may also comprise a wireless hotspot, a wireless router, data buffers, data modems, packet routers, servers, memory devices, software, processing systems, cabling, network communication interfaces, physical structural supports, user interfaces, or other communication apparatuses. Wireless local area network access point 110 may also comprise transceiver equipment to communicate over a cellular communication link, such as with a base station of a cellular communication system. Wireless local area network access point 110 may also include processing systems, computer-readable media, application programs, firmware, or some other form of computer-readable processing instructions. The computer-readable media may include a disk, tape, integrated circuit, server, or some other memory device, and also may be distributed among multiple memory devices.

Packet network 130 includes packet network systems, communication links, routers, gateways, and other associated equipment for routing packet communications, such as Internet protocol (IP) packets, between different endpoints. Additional systems and equipment could communicate through packet network 130, such as content providers, application service providers, web content providers, streaming media providers, voice over packet providers, among other communication service providers and content providers. Packet communications transferred by the various endpoints are transferred by packet network 130 for delivery to destinations associated with the packets. Packet network 130 could also include base stations, base station controllers (BSC), mobile switching centers (MSC), radio node controllers (RNC), call processing systems, authentication, authorization and accounting (AAA) equipment, access service network gateways (ASN-GW), Internet access nodes, telephony service nodes, wireless data access points, or other communication systems, including combinations thereof. Packet network 130 may also comprise optical networks, asynchronous transfer mode (ATM) networks, packet networks, metropolitan-area networks (MAN), Internet systems, or other network topologies, equipment, or systems, including combinations thereof.

Wireless link 140 uses the air or space as the transport media. Wireless link 140 may use various protocols, such as IEEE 802.11, Wireless Fidelity (Wi-Fi), Worldwide Interoperability for Microwave Access (WiMAX), Internet Protocol (IP), wireless Ethernet, or some other wireless communication format, including combinations, improvements, or variations thereof. Although one wireless link is shown in FIG. 1, it should be understood that the wireless link is merely illustrative to show communications associated with user device 120.

Communication link 141 uses metal, glass, optical, air, space, or some other material as the transport media. Communication link 141 could use various communication protocols, such as Internet Protocol (IP), Ethernet, Transmission Control Protocol (TCP), Code Division Multiple Access (CDMA), Evolution-Data Optimized (EV-DO), single-carrier radio transmission technology link (1xRTT), Worldwide Interoperability for Microwave Access (WiMAX), Global System for Mobile Communication (GSM), Universal Mobile Telecommunications System (UMTS), Long Term Evolution (LTE), High Speed Packet Access (HSPA), Radio Link Protocol (RLP), Time Division Multiplex (TDM), asynchronous transfer mode (ATM), synchronous optical networking (SONET), circuit-switched, communication signaling, or some other communication format, including combinations, improvements, or variations thereof. Communication link 141 could be a direct link or may include intermediate networks, systems, or devices.

Links 140-141 may each include many different signals sharing the same link—as represented by the associated lines in FIG. 1—comprising access channels, paging channels, notification channels, forward links, reverse links, user communications, communication sessions, overhead communications, frequencies, other channels, carriers, timeslots, spreading codes, transportation ports, logical transportation links, network sockets, packets, or communication directions.

FIGS. 1-6 and the previous descriptions depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A method of operating a wireless local area network (WLAN) access point, the method comprising:
    providing the WLAN for a user device to access a packet network, wherein the user device receives requested content transferred over the packet network through the WLAN access point;
    receiving a message for delivery to the user device from a local interface of the WLAN access point;
    in response to receiving the message for delivery to the user device, inhibiting transfer of the requested content received over the packet network to the user device;
    transferring the message to the user device using addressing information associated with the requested content; and
    in response to receiving a confirmation of the message from the user device, resuming transfer of the requested content to the user device.

2. The method of claim 1, further comprising:
    processing the requested content to determine the addressing information associated with the requested content.

3. The method of claim 1, wherein the addressing information associated with the requested content comprises a header of a packet associated with the requested content.

4. The method of claim 1, wherein inhibiting transfer of the requested content received over the packet network to the user device comprises halting transfer of the requested content to the user device and buffering the requested content.

5. The method of claim 4, wherein resuming transfer of the requested content to the user device comprises transferring the buffered requested content to the user device.

6. The method of claim 1, wherein receiving the message for delivery to the user device from the local interface of the WLAN access point comprises receiving the message from a second user device communicating on the WLAN for delivery to the user device.

7. The method of claim 1, wherein transferring the message to the user device comprises processing the message and the requested content to determine alternate content for delivery to the user device, wherein the alternate content comprises the message in a data format of the requested content, and transferring the alternate content to the user device for display in an application on the user device expecting the requested content.

8. The method of claim 1, wherein providing the WLAN for the user device comprises establishing a first Internet protocol (IP) address for the user device through a first Dynamic Host Configuration Protocol (DHCP) process;
   wherein inhibiting transfer of the requested content comprises establishing a second IP address for the user device through a second DHCP process;
   wherein transferring the message to the user device comprises transferring the message using the second IP address; and
   wherein resuming transfer of the requested content to the user device comprises re-establishing the first IP address for the user device and transferring the requested content to the user device using the first IP address.

9. The method of claim 1, wherein providing the WLAN for the user device to access the packet network comprises providing an IEEE 802.11 WLAN for the user device to access the WLAN access point, and establishing a wireless communication link between the WLAN access point and a cellular base station to provide access to the packet network for the IEEE 802.11 WLAN.

10. A wireless local area network (WLAN) access point, comprising:
   a WLAN interface configured to provide the WLAN for a user device to access a packet network, wherein the user device receives requested content transferred over the packet network through the WLAN access point;
   a local interface of the WLAN access point configured to receive a message for delivery to the user device;
   in response to receiving the message for delivery to the user device, the WLAN interface configured to inhibit transfer of the requested content received over the packet network to the user device;
   the WLAN interface configured to transfer the message to the user device using addressing information associated with the requested content, and receive a confirmation of the message from the user device, and in response to the confirmation of the message, resume transfer of the requested content to the user device.

11. The WLAN access point of claim 10, further comprising:
   a processing system configured to process the requested content to determine the addressing information associated with the requested content.

12. The WLAN access point of claim 10, wherein the addressing information associated with the requested content comprises a header of a packet associated with the requested content.

13. The WLAN access point of claim 10, wherein the WLAN interface is configured to halt transfer of the requested content to the user device and buffer the requested content to inhibit transfer of the requested content received over the packet network to the user device.

14. The WLAN access point of claim 13, wherein the WLAN interface is configured to transfer the buffered requested content to the user device to resume transfer of the requested content to the user device.

15. The WLAN access point of claim 10, wherein the local interface is configured to receive the message from a second user device communicating on the WLAN for delivery to the user device to receive the message for delivery to the user device.

16. The WLAN access point of claim 10, further comprising:
   a processing system configured to process the message and the requested content to determine alternate content for delivery to the user device, wherein the alternate content comprises the message in a data format of the requested content; and
   the WLAN interface configured to transfer the alternate content to the user device for display in an application on the user device expecting the requested content.

17. The WLAN access point of claim 10, wherein the WLAN interface is configured to establish a first Internet protocol (IP) address for the user device through a first Dynamic Host Configuration Protocol (DHCP) process to provide the WLAN for the user device;
   wherein the WLAN interface is configured to establish a second IP address for the user device through a second DHCP process to halt transfer of the requested content;
   wherein the WLAN interface is configured to transfer the message using the second IP address to transfer the message to the user device; and
   wherein the WLAN interface is configured to re-establish the first IP address for the user device and transfer the requested content to the user device using the first IP address to resume transfer of the requested content to the user device.

18. The WLAN access point of claim 10, wherein the WLAN interface is configured to provide an IEEE 802.11 WLAN for the user device to access the WLAN access point, and
   further comprising:
   a cellular communication interface configured to establish a wireless communication link between the WLAN access point and a cellular base station to provide access to the packet network.

19. A method of operating a wireless local area network (WLAN) access point, the method comprising:
   providing the WLAN for a user device to access a packet network, wherein the user device receives requested content transferred over the packet network through the WLAN access point;
   processing device status of the WLAN access point to determine a message for delivery to the user device;
   in response to determining the message for delivery to the user device, inhibiting transfer of the requested content received over the packet network to the user device;
   transferring the message to the user device using addressing information associated with the requested content; and
   in response to receiving a confirmation of the message from the user device, resuming transfer of the requested content to the user device.

20. The method of claim 19, wherein the device status comprises at least one of a battery status, a radio frequency (RF) signal strength, and a cellular roaming status, of the WLAN access point.

* * * * *